(12) United States Patent
Schneider

(10) Patent No.: US 8,638,926 B2
(45) Date of Patent: Jan. 28, 2014

(54) SHARING A SECRET WITH MODULAR INVERSES

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 673 days.

(21) Appl. No.: 12/393,967

(22) Filed: Feb. 26, 2009

(65) Prior Publication Data
US 2010/0215172 A1 Aug. 26, 2010

(51) Int. Cl.
*H04K 1/00* (2006.01)
*H04L 9/00* (2006.01)
*H04L 9/28* (2006.01)

(52) U.S. Cl.
USPC ............................... 380/28; 380/44; 380/277

(58) Field of Classification Search
USPC ............................................. 380/28, 44, 277
See application file for complete search history.

(56) References Cited

U.S. PATENT DOCUMENTS

| | | | |
|---|---|---|---|
| 5,625,692 A * | 4/1997 | Herzberg et al. | 380/286 |
| 6,473,508 B1 * | 10/2002 | Young et al. | 380/30 |
| 7,194,089 B2 * | 3/2007 | Algesheimer et al. | 380/28 |
| 7,421,080 B2 * | 9/2008 | Matsumura et al. | 380/277 |
| 2002/0039420 A1 * | 4/2002 | Shacham et al. | 380/277 |
| 2003/0112969 A1 * | 6/2003 | Algesheimer et al. | 380/28 |
| 2004/0179686 A1 * | 9/2004 | Matsumura et al. | 380/44 |
| 2009/0003597 A1 * | 1/2009 | Gantman et al. | 380/44 |

OTHER PUBLICATIONS

Some Recent Research Aspects of Threshold Cryptography (1997) by Yvo Desmedt , Royal Holloway.*
Asymptotically optimal communication for torus-based cryptography (2004) by Marten Van Dijk , David Woodruff.*
Schneier, Bruce, "Applied Cryptography, Second Edition—Protocols, Algorithms and Source Code in C", © 1996, John Wiley & Sons, Inc., title pages, pp. viii and 47-74.
Asmuth, Charles et al., "A Modular Approach to Key Safeguarding", *IEEE Transactions on Information Theory*, vol. IT-29, No. 2, Mar. 1983, pp. 208-210.
Blakley, G. R. et al., "Safeguarding Cryptographic Keys", *National Computer Conference, 1979, AFIPS—Conference Proceedings*, vol. 48, AFIPS Press, Montvale, NJ 07645, pp. 313-317.
Blakley, G. R. et al., "Security of Ramp Schemes", *Lecture Notes in Computer Science—Advances in Cryptoloqy, Proceedings of CRYPTO 84*, Springer-Verlag, pp. 242-268.
Shamir, Adi et al., "How to Share a Secret", *Programming Techniques, Communications of the ACM*, Nov. 1979, vol. 22, No. 11, pp. 612-613.

* cited by examiner

Primary Examiner — Kambiz Zand
Assistant Examiner — Benjamin Kaplan
(74) *Attorney, Agent, or Firm* — Lowenstein Sandler LLP

(57) ABSTRACT

A method and system distributes N shares of a secret among cooperating entities by calculating the multiplicative inverses of the secret. In one embodiment, a distributor selects N distinct prime numbers and forms unique subsets of the prime numbers, with each subset containing K of the N prime numbers (N>=K), where K is a threshold number of shares necessary to reconstruct the secret. The distributor calculates a product of the prime numbers in each subset, and, for each subset, calculates the multiplicative inverse of the secret modulo the product. A total of N shares are generated, with each share containing the multiplicative inverses and one of the prime numbers. The N shares are distributed to the cooperating entities for secret sharing.

23 Claims, 6 Drawing Sheets

| | $S^{-1} \bmod m_i$ | $(S^2)^{-1} \bmod m_i$ | $(S^3)^{-1} \bmod m_i$ |
|---|---|---|---|
| $m_1$ | $R_{11}$ | $R_{21}$ | $R_{31}$ |
| $m_2$ | $R_{12}$ | $R_{22}$ | $R_{32}$ |
| $m_3$ | $R_{13}$ | $R_{23}$ | $R_{33}$ |
| .. | .. | .. | .. |
| $m_U$ | $R_{1U}$ | $R_{2U}$ | $R_{3U}$ |

KNOWN INVERSES 109

PRODUCTS OF PRIMES (UNKNOWN)

FIRST SET OF INVERSES 151

SECOND SET OF INVERSES 152

THIRD SET OF INVERSES 153

FIG. 1B

SHARING A SECRET WITH MODULAR INVERSES

TECHNICAL FIELD

Embodiments of the present invention relate to cryptographic techniques, and more specifically, to sharing a secret among cooperating parties.

BACKGROUND

In cryptography, secret sharing refers to any method for distributing a secret among a group of participants, each of which is allocated one or more shares of the secret. The secret can only be reconstructed when a required number of shares are combined together; individual shares are of no use on their own.

A secure secret sharing scheme distributes shares so that anyone with fewer than the required shares has no extra information about the secret than someone with zero shares. Some secret sharing schemes allow the secret to be reconstructed by a subset of the total number of generated shares. Thus, a secret can be reconstructed even when some of the shares are lost or when some of the shareholders are absent. In general, secret sharing schemes are based on mathematical problems that are "easy" to solve with a threshold amount of information, but "hard" without that threshold amount.

Conventional secret sharing schemes are based on polynomial interpolation, linear equation interpolation, simultaneous systems of linear equations, and simultaneous systems of modular equivalences. These secret sharing schemes have different degrees of complexity and different requirements. The amount of information held by each shareholder also varies from one scheme to another.

BRIEF DESCRIPTION OF THE DRAWINGS

One or more embodiments of the present invention are illustrated by way of example and not limitation in the figures of the accompanying drawings, in which like references indicate similar elements and in which:

FIG. 1B is an example of the multiplicative inverses of the secret that are stored in secure storage.

DETAILED DESCRIPTION

Figure 1A:
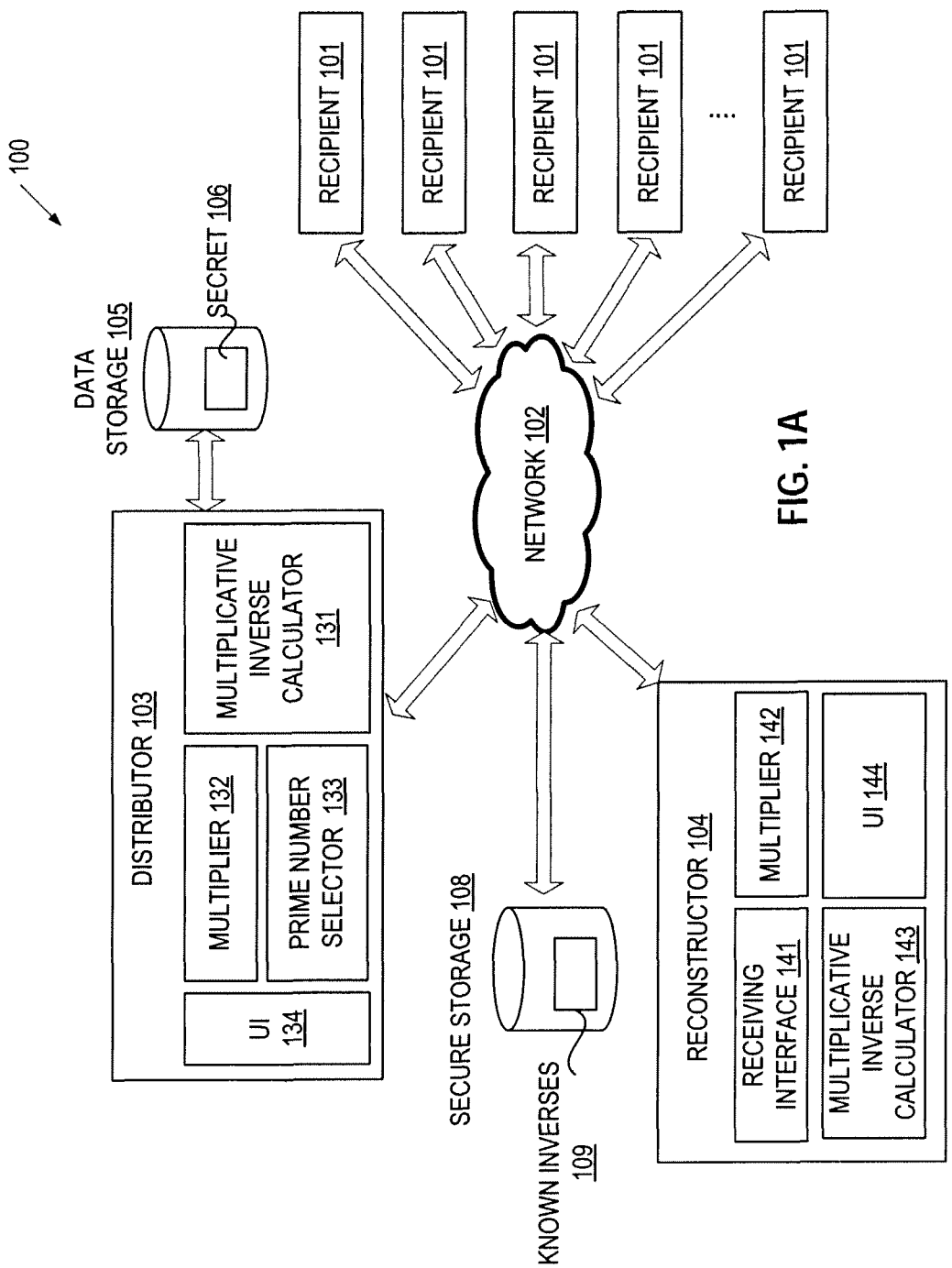
FIG. 1A illustrates a network architecture in which embodiments of the present invention may be implemented.

A method and system distributes N shares of a secret among cooperating entities by calculating the multiplicative inverses of the secret. In one embodiment, a distributor selects N distinct prime numbers and forms unique subsets of the prime numbers, with each subset containing K of the N prime numbers (N>=K), where K is a threshold number of shares necessary to reconstruct the secret. The distributor calculates a product of the prime numbers in each subset, and for each subset, calculates the multiplicative inverse of the secret modulo the product. A total of N shares are generated, with each share containing the multiplicative inverses and one of the prime numbers. The N shares are distributed to the cooperating entities for secret sharing.

To reconstruct the secret, a subset of the shares is collected from some or all of the cooperating entities. In one embodiment, a reconstructor collects K of the distributed shares, and calculates the product of the K prime numbers in the K shares. Using the multiplicative inverses obtained from the K shares (also referred to as known inverses), the reconstructor further calculates the multiplicative inverses for each of the known inverses modulo the product. One of the resulting multiplicative inverses is a reconstructed secret.

In a simplified scenario where the number of generated shares N is equal to the threshold number of shares K, the secret sharing scheme described herein generates one distinct prime number (also referred to as "prime") for each share, and finds the multiplicative inverse of the secret, modulo the product of the primes. Each share contains the multiplicative inverse and one of the primes.

An exemplary use of the secret sharing technique is a multi-factor key escrow system, where shares from a master key are given to a set of federated entities such that a subset of these shares can be used to reconstruct the master key. For example, an employee of a company in a high-security position (e.g., a corporate controller, or a human resources specialist) may have a master password that protects a secret key they need to use to authenticate on their corporate workstation. Ordinarily, this master key is only used by this employee. However, if something were to happen to this employee, his/her replacement would need to be able to gain access to this master key. As the master key provides its owner access to sensitive data, the company cannot just give a backup copy of the master key to someone for safe keeping (e.g., it would be disastrous if a disgruntled employee was able to cut himself a million dollar severance check). Thus, the master key can be split up into multiple shares, so that a share is held by each of several trusted employees. A minimum number of these trusted employees would need to present their shares and reconstruct the secret (i.e., the master key). Illustratively, one share may go to the employee's boss, and other shares may be distributed to other department heads or managers.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "selecting", "calculating", "distributing", "verifying", "adjusting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored instructions thereon, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1A illustrates an exemplary cryptosystem 100 in which embodiments of the present invention may operate. The cryptosystem 100 includes a plurality of recipients 101 and a distributor 103 coupled by a network 102, which may be a public network (e.g., Internet) or a private network (e.g., Ethernet or a Local Area Network (LAN)). In one embodiment, the distributor 103 is a computing system that calculates and distributes shares of a locally-stored secret, and recipients 101 are also computing systems that manages the received shares. Alternatively, the distributor 103 may be a computing system and each recipient 101 may be a storage device for receiving and storing one or more shares of a secret. The distributor 103 is locally coupled to data storage 105 in which a secret 106 is stored. Data storage 105 may include one or more storage devices (e.g., the computer-readable medium described above) that are local to the distributor 103 and/or remote from the distributor 103. In alternative embodiments, the secret 106 may be stored in the main memory of the distributor 103. In one embodiment, the secret 106 may be a cryptographic key, a password, or any secret message to be jointly held in escrow by the recipients 101.

The secret 106 may be a number, a bit string, an ASCII coded text or other representations that can be converted into a sequence of numbers, with each number an element of a ring, e.g., an integer ring. However, the secret sharing scheme is not restricted to the integers—any ring with a computable division with remainder operation can be used. As addition and multiplication are defined in a ring, each element in a ring has a multiplicative inverse. The multiplicative inverse of an element in a given ring can be computed using known mathematical algorithms, such as the extended Euclidean algorithm.

To safeguard the secret 106, the distributor 103 generates a plurality of shares of the secret 106 and distributes one or more shares to each of the recipients 101 through the network 102. The secret 106 can be reconstructed from all or a subset of the distributed shares. According to one embodiment of the present invention, one distinct prime is selected for each share to be generated. Each share contains one of the primes and one or more multiplicative inverses of the secret. The generation of the shares will be described in greater detail with reference to FIG. 2.

In one embodiment, the cryptosystem 100 also includes a reconstructor 104 to reconstruct the secret 106 using the distributed shares. The reconstructor 104 collects a threshold number of shares, and uses the primes and multiplicative inverses in the share (also referred to as "known inverses") to calculate the multiplicative inverse of the known inverses. The resulting multiplicative inverse is the original secret. A person of ordinary skill in the art would appreciate that the reconstructor 104 may be a separate computing system as shown in FIG. 1A, or, alternatively, may reside in the same computing system as the distributor 103 or any of the recipients 101. In one embodiment, the distributor 103, the recipients 101 and/or the reconstructor 104 may be, for example, servers, personal computers (PCs), mobile phones, palm-sized computing devices, personal digital assistants (PDAs), or the like.

In one embodiment, the multiplicative inverses contained in the shares may be stored as known inverses 109 in secure storage 108, which is accessible by the reconstructor 104. Storing the known inverses 109 in secure storage 108 can reduce the amount of data sent over the network 102 to the recipients 101 and the amount of data stored at the recipients 101. In alternative embodiments, the distributor 103 may send the known inverses 109 with the prime numbers to the recipients 101 without using the secure storage 108.

In one embodiment, the distributor 103 includes a user interface 134 to receive commands from one or more authorized users (e.g., a system administrator) to invoke share calculations, a multiplicative inverse calculator 131 to compute the multiplicative inverses of the secret 106. In one embodiment, the multiplicative inverse calculator 131 includes arithmetic processing units, such as adders, multipliers, subtractors, etc., as well as memory circuitry, such as registers, RAM, etc., to perform calculations in accordance with the extended Euclidean algorithm. The distributor 103 also includes a prime number selector 133 to select prime numbers, and a multiplier 132 to calculate the products of the selected primes. To enhance security of the shared secret, prime numbers are selected based on the size of the secret. For example, to enhance security of the shared secret, the prime number selector 133 selects each prime number to be greater than the secret (or the largest value in the sequence of numbers that represent the secret). To further improve security, the prime number selector 133 can select each prime as a "strong" prime in the sense that the selected prime is equal to twice another prime plus one (e.g., 11=2*5+1. Thus, 11 is a strong prime).

In one embodiment, the prime number selector 133 may select the primes such that the reconstructor 104 can more easily identify the original secret from a number of candidates during secret reconstruction. For example, the prime number selector 133 can select the primes so that the smallest generated product is greater than the cube of the largest possible secret. To provide additional verification information in the shares, the distributor 103 can share the secret, its square and its cube. The correct reconstructed secret is the one where the three parts are related as x, $x^2$ and $x^3$. The sharing of the square and the cube of the secret will be described in greater detail with respect to FIGS. 1B and 2.

In one embodiment, the reconstructor 104 includes a UI 144 to receive commands from one or more authorized users (e.g., a system administrator) to invoke secret reconstruction, a receiving interface 141 to collect shares of the secret 106 from the recipients 101 and the secure storage 108, a multiplier 142 to compute the product of the primes in the collected shares, and a multiplicative inverse calculator 143 to calculate the multiplicative inverses of the known inverses 109 in the collected shares. In one embodiment, the multiplicative inverse calculator 143 includes arithmetic processing units, such as adders, multipliers, subtractors, etc., as well as memory circuitry, such as registers, RAM, etc., to perform calculations in accordance with the extended Euclidean algorithm.

FIG. 1B illustrates an example of the format of the known inverses 109 stored in secure storage 108. The known inverses 109 may be stored in a table that includes a first set of inverses 151, a second set of inverses 152 and a third set of inverses 153. In some embodiments, the distributor 103 has sufficient computing power to verify, before share distribution, that the secret can be uniquely reconstructed from each subset of selected primes. In these embodiments, the table may include only the first set of inverses 151, or only the first and second sets of inverses 151, 152. The first set of inverses 151 includes the multiplicative inverses of the secret (S) modulo each of the products $(m_1, m_2, \ldots, m_U)$, wherein $m_i$ represents the product of a unique subset of the selected primes, U=N!/(K!(N−K)!), N! represents the factorial of N, N is the number of generated shares, and K is the threshold number of shares for secret reconstruction. For example, a (4, 3) scheme with N=4 and K=3 has U=4, indicating that there are 4 unique 3-element subsets. A (5, 3) scheme with N=5 and K=3 has U=10, indicating that there are 10 unique 3-element subsets. If N=K, a U value of one indicates that there is only one unique subset of the primes.

The second and third sets of inverses 152, 153 provide verifiable information for identifying the original secret from possible candidate secrets. The second set of inverses 152 includes the multiplicative inverses of the secret square ($S^2$) modulo each of the products $(m_1, m_2, \ldots, m_U)$. The shares can additionally contain the third set of inverses 153 that includes the multiplicative inverses of the cube of the secret ($S^3$) modulo each of the products $(m_1, m_2, \ldots, m_U)$. The reconstructor 104 can access the three sets of inverses 151-153, without knowing the values of the products $(m_1, m_2, \ldots, m_U)$. If all three sets of inverses 151-153 are used, each share will contain all three sets of inverses 151-153 and one of the selected primes.

Figure 2:
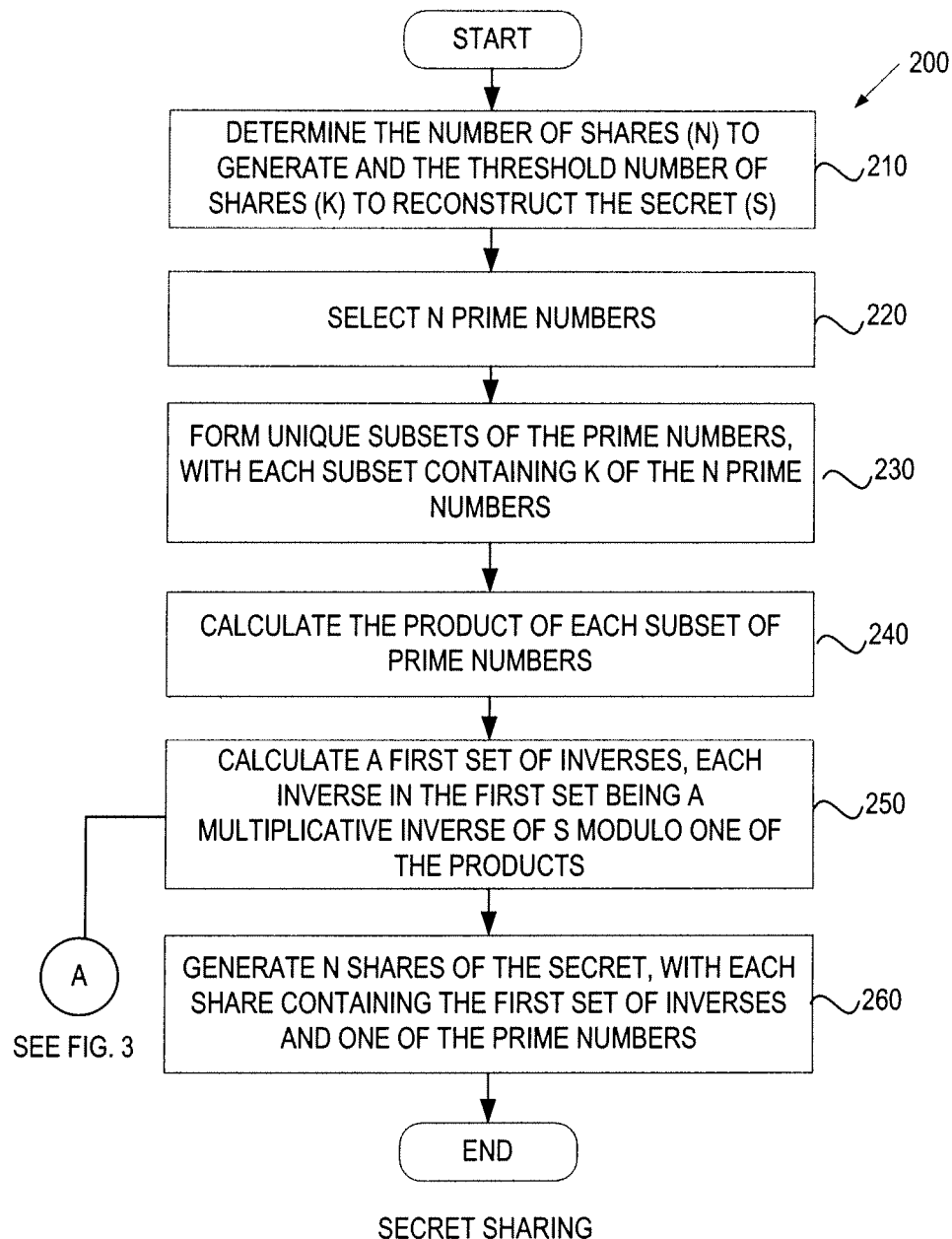
FIG. 2 is a flow diagram of a secret sharing method according to one embodiment of the present invention.

FIG. 2 illustrates a flow diagram of one embodiment of a method 200 for generating a plurality of shares from a secret (e.g., the secret 106). The method 200 may be performed by the processing logic 526 of FIG. 5 that may comprise hardware (e.g., circuitry, dedicated logic, programmable logic, microcode, etc.), software (such as instructions on a computer readable storage medium executable by a processing device), or a combination thereof. In one embodiment, the method 200 is performed by the distributor 103 of FIG. 1A.

Referring to FIG. 2, at block 210, the method 200 begins when the distributor 103, invoked by one or more authorized users (e.g., a system administrator) through the UI 134, determines the total number (N) of shares to be generated and the threshold number (K) of shares for reconstruction. The determination may be made by the authorized user based on the available computing or storage resources and the available number of recipients 101 that can jointly hold the shares of the secret (S). At block 220, N prime numbers are selected. In one embodiment, the prime number selector 133 selects the prime numbers such that the smallest generated product is larger than the cube of the secret, or the largest possible secret if a sequence of secrets are to be distributed.

At block 230, the distributor 103 forms unique subsets of the prime numbers, with each subset containing K of the N primes. The number of unique K-element subsets from a set of N elements is equal to U=N!/(K!(N−K)!), where N! represents the factorial of N. At block 240, the distributor 103 calculates a product of the K primes in each unique subset. As a result, U products $(m_1, m_2, \ldots, m_U)$ are generated. At block 250, the distributor 103 calculates the first set of inverses 151, with each inverse being the multiplicative inverse of the secret (S) modulo one of the products $(m_1, m_2, \ldots, m_U)$. The number of inverses in the first subset is equal to U, which is the number of unique subsets of K prime numbers.

In one embodiment, at block 260, the distributor 103 generates N shares of the secret, with each share containing the U multiplicative inverses and one of the N prime numbers. The distributor 103 can distribute the entire contents of N shares to the recipients 101, or only distribute the N prime numbers to the recipients 101. If only the N prime numbers are distributed to the recipients 101, the distributor 103 can store the U multiplicative inverses (in the table of the known inverses 109) in secure storage 108, which is accessible by authorized entities (e.g., the reconstructor 104) for secret reconstruction. The method 200 then terminates.

Figure 3:
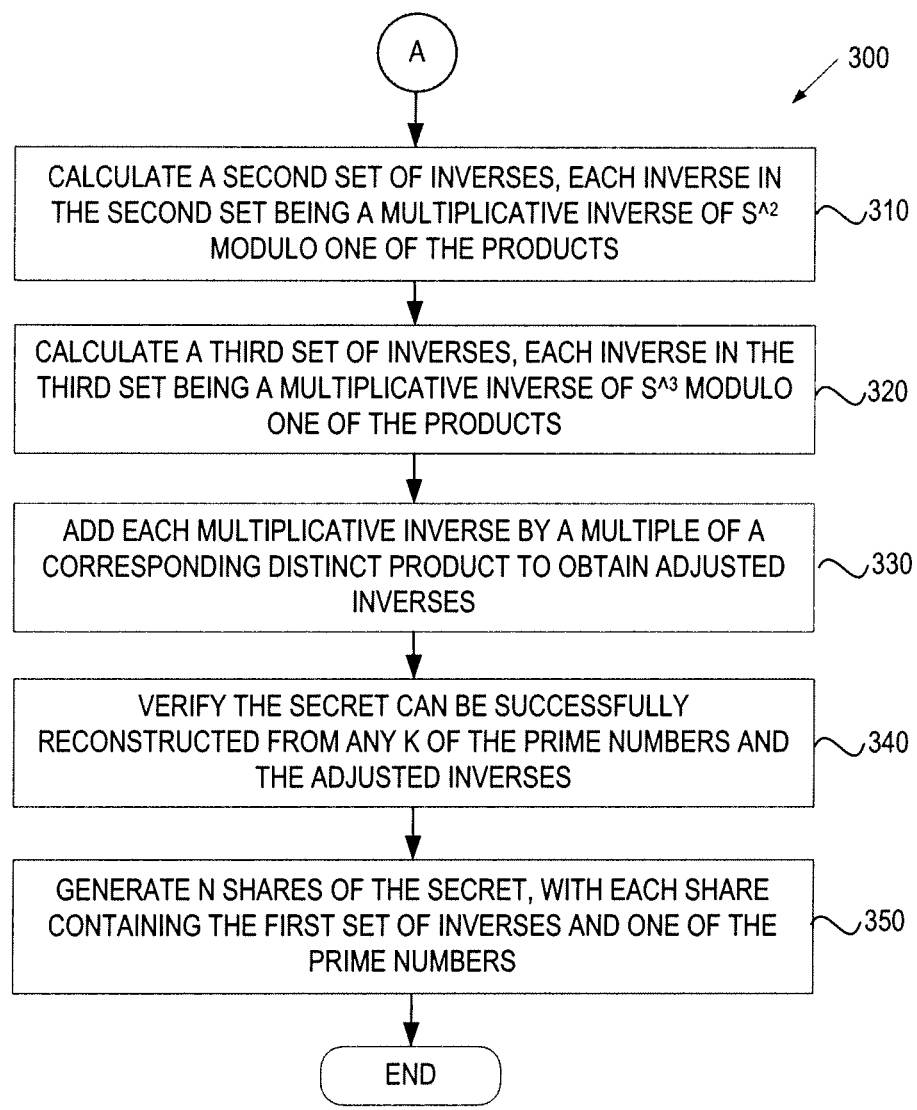
FIG. 3 is a flow diagram of an extension to the secret sharing method of FIG. 2.

In some scenarios, the multiplicative inverses generated by the method 200 may lead to a large number of candidate secrets during reconstruction. In these scenarios, the second and third sets of inverses 152 and 153 can be used to identify the original secret from the candidate secrets. Otherwise, information external to the distributed shares may be needed to identify the original secret. The method 200 may be extended to provide verification information (the second and third sets of inverses 152 and 153) in the distributed shares. The extension to the method 200 is shown in FIG. 3 as a method 300. The method 300 continues the operations of blocks 210-250 in FIG. 2 and branches off at point "A." The method 300 may be performed by the processing logic 526 of FIG. 5 that may comprise hardware (e.g., circuitry, dedicated logic, programmable logic, microcode, etc.), software (such as instructions on a computer readable storage medium executable by a processing device), or a combination thereof. In one embodiment, the method 300 is performed by the distributor 103 of FIG. 1A.

The method 300 starts with blocks 210-250 as described above with reference to FIG. 2. After the distributor 103 calculates the first set of inverses 151 at block 250, the distributor 103 calculates, at block 310, the second set of inverses 152. Each inverse in the second set is the multiplicative inverse of the square of the secret ($S^2$) modulo one of the products ($m_1, m_2, \ldots, m_U$). A block 320, the distributor 103 calculates the third set of inverses 153. Each inverse in the third set is the multiplicative inverse of the cube of the secret ($S^3$) modulo one of the products ($m_1, m_2, \ldots, m_U$). In one embodiment, each inverse in the first, second and third sets 151-153 can be adjusted, at block 330, by incrementing its value by a multiple of the corresponding product ($m_1, m_2, \ldots, m_U$). For example, the same or different multiples of $m_1$ can be added to the inverses $R_{11}$, $R_{21}$ and $R_{31}$ (FIG. 1B). The multiples can be determined such that the sum (the adjusted value) is as close as possible to a predetermined value. In a secure implementation, the predetermined value can be a value larger than the largest product of any (K+1) of the selected prime numbers.

At this point, the distributor 103 can verify, at block 340, that the original secret can be successfully reconstructed from the three sets of inverses 151-153 (also referred to as adjusted inverses to indicate the adjustment performed at block 330) and any K of the N prime numbers. This operation is performed to eliminate a very small, but non-zero, chance that a particular subset of the primes may result in multiple possible candidate secrets. The verification can be performed by reconstructing the secret from each subset of primes to determine whether only one candidate secret is produced. At block 350, the distributor 103 generates the N shares, with each share including the three sets of adjusted inverses 151-153 and one of the primes. The method 300 then terminates.

In one embodiment where the distributor 103 has sufficient computing power, the distributor can compute only the first and second sets of adjusted inverses 151-152, and check each subset of shares to ensure that only one candidate secret is produced. In this embodiment, each share will include the two sets of adjusted inverses 151, 152 and one of the primes.

Figure 4:
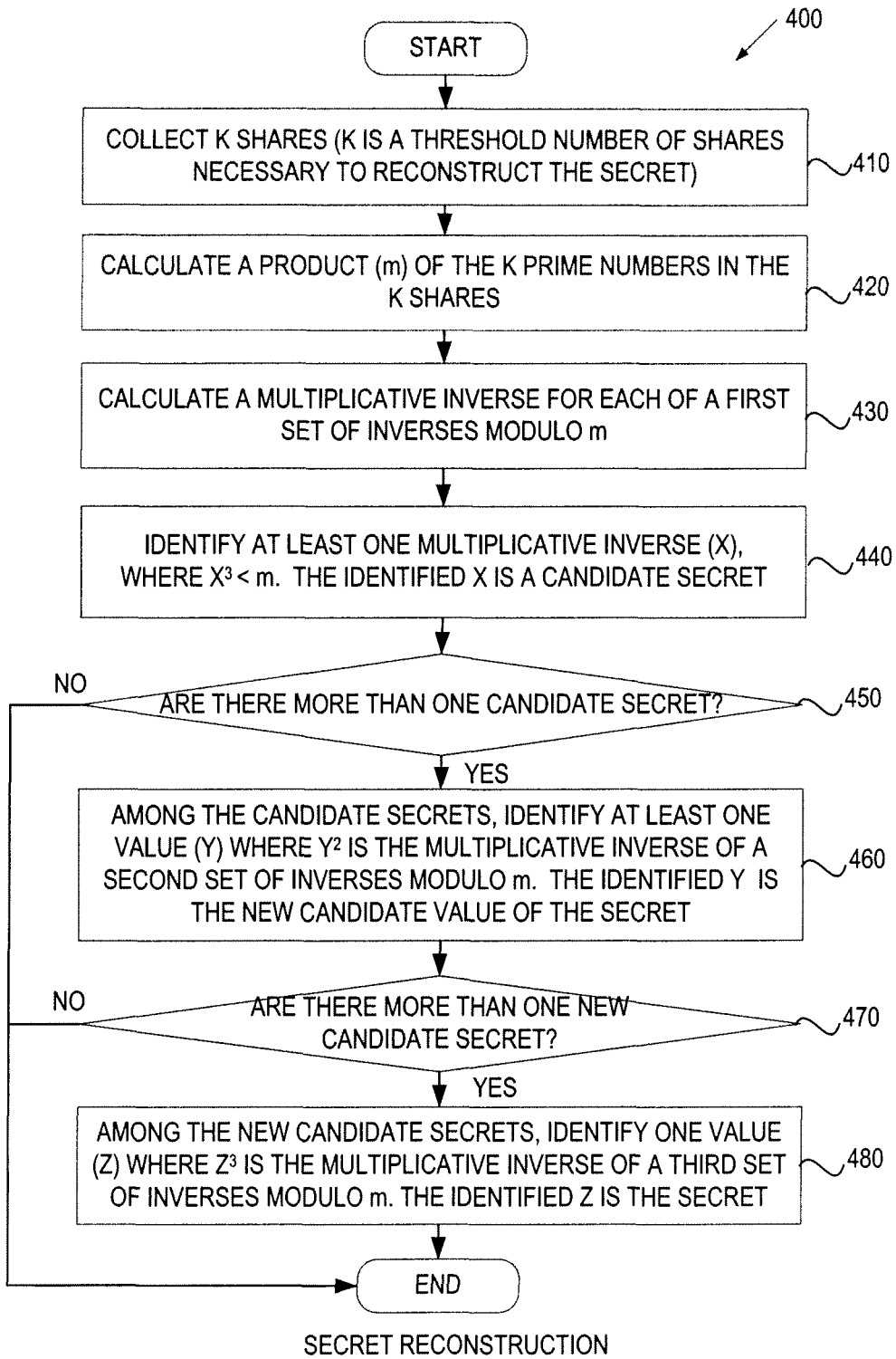
FIG. 4 is a flow diagram of a secret reconstruction method according to one embodiment of the present invention.

Having described the techniques for share generation, the following descriptions explain, in detail, an embodiment of the technique for reconstructing the secret from the distributed shares. FIG. 4 illustrates a flow diagram of an embodiment of a method 400 for reconstructing the secret from the distributed shares. The method 400 may be performed by the processing logic 526 of FIG. 5 that may comprise hardware (e.g., circuitry, dedicated logic, programmable logic, microcode, etc.), software (such as instructions on a computer readable storage medium executable by a processing device), or a combination thereof. In one embodiment, the method 400 is performed by the reconstructor 104 of FIG. 1A.

Referring to FIG. 4, at block 410, the receiving interface 141 of the reconstructor 104, invoked by one or more authorized users (e.g., a system administrator) through the UI 144, collects K shares of the secret. Each of the K shares includes a distinct prime number and the first set of inverses 151 (with or without adjusted values). In one embodiment, the first set of inverses 151 can be collected from the recipients 101. In an alternative embodiment, the first set of inverses 151 can be collected from a central location (e.g., the secure storage 108), which is accessible by the reconstructor 104. At block 420, the multiplier 142 of the reconstructor 104 calculates a product (m) of the K prime numbers. At block 430, the multiplicative inverse calculator 143 of the reconstructor 104 calculates a multiplicative inverse for each of the first set of inverses 151 modulo m. As a result, U=N!/(K!(N−K)!) multiplicative inverses are produced. At block 440, the reconstructor 104 identifies, among the U results, at least one value X, where $X^3$<m. The identified X is a candidate secret. However, it is possible that more than one value satisfies the condition $X^3$<m. At block 450, the reconstructor 104 determines whether there are more than one candidate secret that satisfies the condition $X^3$<m. If there is only candidate secret X, then that value of X is the original secret and the method 400 terminates. If there are more than one candidate secrets X, the reconstructor 104 determines, among the candidates secrets, at least one value Y, where $Y^2$ is the multiplicative inverse of the second set of inverses 152 modulo m. The identified value Y is the new candidate secret. The reconstructor 104 can identified the new candidate secret by eliminating some of the candidate secrets X produced at block 440. For example, the reconstructor 104 can multiply each value in the second set of inverses 152 by the square of a corresponding value X. The X values that do not result in a value of 1 are eliminated. The remaining candidate secrets become the new candidate secrets Y.

At block 470, the reconstructor 104 determines whether there are more than one new candidate secrets. If there is only one new candidate secret, then that value is the secret and the method 400 terminates If there are more than one new candidate secrets, at block 480, the reconstructor 104 identifies a value Z among the new candidate secrets Y, where $Z^3$ is the multiplicative inverse of the third set of inverses 153 modulo m. The identified value Z is the original secret. The reconstructor 104 can identify the original secret by eliminating all but one new candidate secrets Y identified at block 460. For example, the reconstructor 104 can multiply each value in the third set of inverses 153 by the cube of a corresponding value Y. The Y values that do not result in a value of 1 are eliminated. The remaining new candidate secret Z is the original secret. The method 300 then terminates.

In some rare scenarios, there can be more than one possible value Z that satisfies the condition at block 480. In such scenarios, the reconstructor 104 will need additional information to determine which one of the values Z is the original secret.

The following description provides an example of the secret sharing and reconstruction scheme described above. Assume that the secret to be shared is the decimal number 19, and the secret is shared among 3 recipients (N=K=3). Three distinct primes, e.g., 17, 23, and 37, are selected and multiplied together to produce 14,467. The multiplicative inverse of 19 modulo 14,467 is 5330. Each share contains this multiplicative inverse and one of the primes. That is, the 3 shares are (5330, 17), (5330, 23) and (5330, 37).

To extend the secret sharing scheme to a threshold scheme where K out of N distributed shares are necessary to reconstruct the secret (N>=K), a distributor can calculate the multiplicative inverse for each set of K primes. For example, to share the secret 19 such that 3 out of 4 shares are needed to reconstruct the secret, 4 primes, e.g., 11, 17, 23, and 29, can be picked. The products of each unique subset of 3 primes are 4301, 5423, 7337, and 11,339. The multiplicative inverses of 19 modulo each of these products are 1811, 1998, 2317, and 2984, respectively. Each share contains these 4 multiplicative inverses, and one of the primes. Therefore, the shares are (1811, 1998, 2317, 2984, 11), (1811, 1998, 2317, 2984, 17), (1811, 1998, 2317, 2984, 23) and (1811, 1998, 2317, 2984, 29). If the 4 multiplicative inverses can be shared securely, the distributor can send just the primes to the recipients.

An extended example is provided as follows. Using the example message of 19, with N=4 and K=3, four primes 23, 29, 31, and 37 can be selected. The 3-prime products (m) are 20,677, 24,679, 26,381 and 33,263. The following table can be constructed, using the multiplicative inverses method:

| m | $19^{-1}$ (modulo m) | $361^{-1}$ (modulo m) | $6859^{-1}$ (modulo m) |
|---|---|---|---|
| 20,677 | 16,324 | 8,477 | 8,064 |
| 24,679 | 12,989 | 8,477 | 14,734 |
| 26,381 | 2,777 | 8,477 | 8,777 |
| 33,263 | 28,011 | 8,477 | 17,953 |

A few interesting artifacts exist in this construction. First, the inverse of the square of the secret is the same for each of the products. Second, the inverse of the secret modulo the largest product is itself larger than any of the other products. These artifacts can be concealed by adding a multiple of the product to each result to bring the sum closest to a predetermined value (e.g., 100,000 for the purpose of illustration). The adjusted table becomes:

| m | $19^{-1}$ (modulo m) | $361^{-1}$ (modulo m) | $6859^{-1}$ (modulo m) |
|---|---|---|---|
| 20,677 | 99,032 | 91,185 | 90,722 |
| 24,679 | 111,705 | 107,193 | 88,771 |
| 26,381 | 108,301 | 87,620 | 87,920 |
| 33,263 | 94,537 | 108,266 | 84,479 |

The shares contain the adjusted inverses (collected as triplets), plus one of each of the primes. The products (m) of the various prime subsets are discarded. With secure storage for the inverses in the table, the distributor only needs to distribute the primes to the recipients.

Reconstructing the secret involves computing the product of the available primes, finding the inverses of the given values, and determining which triplet has the correct mathematical relationships. For example, if the reconstruction is attempted with the primes 23, 27, and 37, the following operations will be performed:
1) Calculate the product of the primes 23, 27, and 37, which is equal to 24,679;
2) Calculate the multiplicative inverses of the first set of inverses in each triplet to obtain 20,696, 19, 5,976, and 4,311; and
3) Eliminate any candidate where the cube of the value is greater than the product (24,679). In this example, it eliminates all but 19.

If there were more candidate values, the second set of inverses in each triplet is multiplied by the square of its respective value calculated in (2) above, and the result is reduced by modulo the product of the primes. Any result that does not produce a value of one is eliminated. For example, to verify that 19 is the original secret, the second set of the inverses corresponding to 19 (i.e., 107,193) can be used to compute 19*19*107193=38,696,673≡1 (modulo 24,679), which confirms that 19 is the secret.

If more than one candidate value remains, the candidate values are cubed, and multiplied by the third set of inverses in their respective triplets, modulo the product of the primes. Any calculation that does not produce a one can be eliminated.

Figure 5:
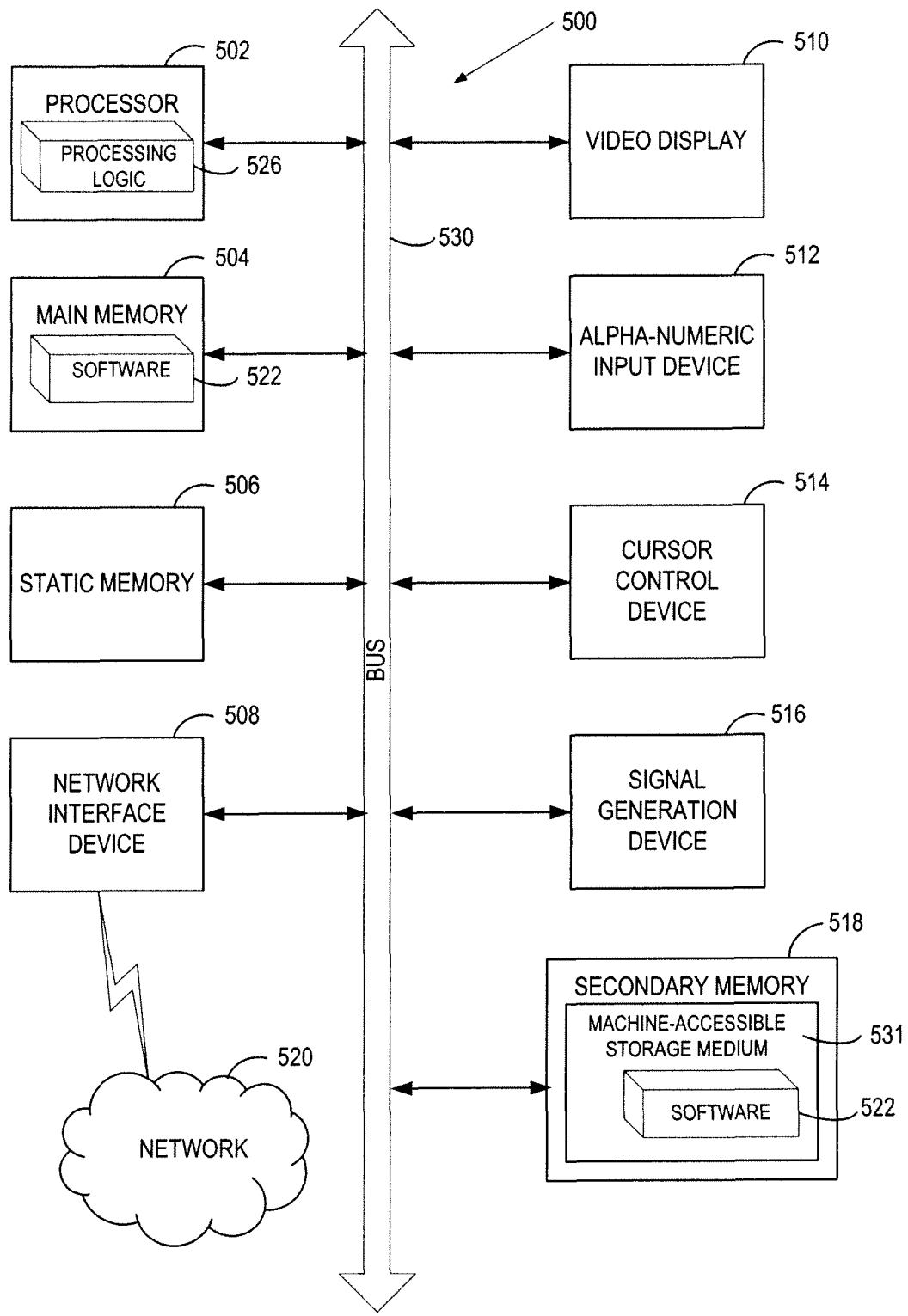
FIG. 5 illustrates a block diagram of an exemplary computer system implementing some embodiments of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the secret 106 of FIG. 1A. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and a system for sharing a secret and authenticating a reconstructed secret have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method for sharing a secret, the method comprising:
    selecting, by a computing system, a first number of distinct prime numbers;
    calculating, by the computing system, products of prime numbers in each unique subset of a second number of the first number of distinct prime numbers, wherein the first number is greater than or equal to the second number, the second number being a threshold number of shares necessary to reconstruct the secret;
    calculating, by the computing system, a first set of inverses, each inverse in the first set being a multiplicative inverse of the secret modulo one of the products;
    generating, by the computing system, the first number of shares of the secret, with each share comprising the first set of inverses and one of the distinct prime numbers; and
    distributing, by the computing system, the distinct prime numbers to a plurality of cooperating entities for storage.

2. The method of claim 1, wherein distributing the distinct prime numbers further comprises:
    storing the first set of inverses in secure storage for secret reconstruction.

3. The method of claim 1, wherein selecting the first number of distinct prime numbers further comprises:
    selecting the first number of distinct prime numbers such that a smallest one of the products is greater than a cube of the secret.

4. The method of claim 1, further comprising:
    calculating a second set of inverses, each inverse in the second set being a multiplicative inverse of a square of the secret modulo one of the products;
    generating the first number of shares with each share comprising the first and second sets of inverses and one of the distinct prime numbers; and
    verifying that the secret can be uniquely reconstructed from each unique subset of the second number of shares of the secret.

5. The method of claim 1, further comprising:
    calculating a second set of inverses, each inverse in the second set being a multiplicative inverse of a square of the secret modulo one of the products;
    calculating a third set of inverses, each inverse in the third set being a multiplicative inverse of a cube of the secret modulo one of the products; and
    generating the first number of shares with each share comprising the first, second and third sets of inverses and one of the distinct prime numbers.

6. The method of claim 1, further comprising:
    adjusting each inverse in the first set by a multiple of a corresponding product to bring the inverse as close to a predetermined value as possible, wherein K is the second number and wherein the predetermined value is greater than a largest product of any (K+1) of the first number of distinct prime numbers.

7. A system for distributing a secret, the system comprising:
    data storage to store a secret;
    a distributor coupled to the data storage, the distributor comprising:
        first circuitry to select a first number of distinct prime numbers;
        a multiplier to calculate products of prime numbers in each unique subset of a second number of the first number of distinct prime numbers, wherein the second number is a threshold number of shares necessary to reconstruct the secret; and
        second circuitry to calculate a first set of inverses, each inverse in the first set being a multiplicative inverse of the secret modulo one of the products, wherein the distributor generates the first number of shares of the secret for storage by a plurality of cooperating entities, each share comprising the first set of inverses and one of the distinct prime numbers.

8. The system of claim 7, further comprises a centrally-located secure storage coupled to the distributor, the secure storage to store the first set of inverses.

9. The system of claim 7, further comprises a centrally-located secure storage coupled to the distributor, the secure storage to store the first set of inverses, a second set of inverses, wherein each inverse in the second set being a multiplicative inverse of a square of the secret modulo one of the products.

10. The system of claim 7, further comprises a centrally-located secure storage coupled to the distributor, the secure storage to store the first set of inverses, a second set of inverses and a third set of inverses, wherein each inverse in the second set being a multiplicative inverse of a square of the secret modulo one of the products, and each inverse in the third set being a multiplicative inverse of a cube of the secret modulo one of the products.

11. A non-transitory computer readable storage medium including instructions that, when executed by a processing device, cause the processing device to perform operations comprising:
    selecting, by the processing device, a first number of distinct prime numbers;
    calculating, by the processing device, products of prime numbers in each unique subset of a second number of the first number of distinct prime numbers, wherein the first number is greater than or equal to the second number, the second number being a threshold number of shares necessary to reconstruct a secret;
    calculating, by the processing device, a first set of inverses, each inverse in the first set being a multiplicative inverse of the secret modulo one of the products;
    generating, by the processing device, the first number of shares of the secret, with each share comprising the first set of inverses and one of the distinct prime numbers; and
    distributing, by the processing device, the distinct prime numbers to a plurality of cooperating entities for storage.

12. The non-transitory computer readable medium of claim 11, wherein distributing the distinct prime numbers further comprises:
    storing the first set of inverses in secure storage for secret reconstruction.

13. The non-transitory computer readable medium of claim 11, wherein selecting the first number of distinct prime numbers further comprises:
    selecting the first number of distinct prime numbers such that a smallest one of the products is greater than a cube of the secret.

14. The non-transitory computer readable medium of claim 11, the operations further comprising:
    calculating a second set of inverses, each inverse in the second set being a multiplicative inverse of a square of the secret modulo one of the products;
    generating the first number of shares with each share comprising the first and second sets of inverses and one of the distinct prime numbers; and
    verifying that the secret can be uniquely reconstructed from each unique subset of the second number of shares of the secret.

15. The non-transitory computer readable medium of claim 11, the operations further comprising:
    calculating a second set of inverses, each inverse in the second set being a multiplicative inverse of a square of the secret modulo one of the products;
    calculating a third set of inverses, each inverse in the third set being a multiplicative inverse of a cube of the secret modulo one of the products; and
    generating the first number of shares with each share comprising the first, second and third sets of inverses and one of the distinct prime numbers.

16. A computer-implemented method for reconstructing a secret, the method comprising:
    collecting, by a processing device, a first number of prime numbers from a plurality of cooperating entities that jointly hold the secret, the first number being a threshold number of shares necessary to reconstruct the secret;
    calculating, by the processing device, a product of the first number of prime numbers;
    calculating, by the processing device, a multiplicative inverse for each of a first set of known inverses modulo the product, each known inverse in the first set representing a multiplicative inverse of the secret modulo a product of a unique subset of the first number of a second number of prime numbers selected to generate the shares; and
    identifying, by the processing device, a value from the multiplicative inverses as a reconstructed secret.

17. The method of claim 16, wherein identifying the value further comprises:
    determining whether a cube of the value is greater than the product.

18. The method of claim 16, wherein identifying the value further comprises:
    computing a square of the value; and
    determining whether the square of the value is the multiplicative inverse of a second set of known inverses, wherein each known inverse in the second set represents a multiplicative inverse of a square of the secret modulo a distinct product of prime numbers that were selected to generate the shares.

19. The method of claim 16, wherein identifying the value further comprises:
    computing a cube of the value; and
    determining whether the cube of the value is the multiplicative inverse of a third set of known inverses, wherein each known inverse in the third set represents a multiplicative inverse of a cube of the secret modulo a distinct product of prime numbers that were selected to generate the shares.

20. A system for reconstructing a secret, the system comprising:
    a receiving interface to collect a first number of prime numbers from a plurality of cooperating entities that jointly hold the secret, wherein the first number is a threshold number of shares necessary to reconstruct the secret;
    a multiplier to calculate a product of the first number of prime numbers; and
    circuitry to calculate a multiplicative inverse for each of a first set of known inverses modulo the product, wherein each known inverse in the first set represents a multiplicative inverse of the secret modulo a product of a unique subset of the first number of a second number of prime numbers that were selected to generate the shares, and to identify a value from the multiplicative inverses as a reconstructed secret.

21. The system of claim 20, wherein the circuitry further determines whether a cube of the value is greater than the product.

22. The system of claim 20, wherein the circuitry further computes a square of the value and determines whether the square of the value is the multiplicative inverse of a second set of known inverses, wherein each known inverse in the second set represents a multiplicative inverse of a square of the secret modulo a distinct product of prime numbers that were selected to generate the shares.

23. The system of claim 20, wherein the circuitry further computes a cube of the value and to determine whether the cube of the value is the multiplicative inverse of a third set of known inverses, wherein each known inverse in the third set represents a multiplicative inverse of a cube of the secret modulo a distinct product of prime numbers that were selected to generate the shares.

* * * * *